United States Patent [19]

Ryan

[11] 4,333,536
[45] Jun. 8, 1982

[54] PLOW SHANK AND DIGGING BLADE ATTACHED TO LOWER EXTREMITY THEREOF BY ADAPTOR

[75] Inventor: John W. Ryan, Yowie Bay, Australia

[73] Assignee: Agrowplow Pty. Limited, Yowie Bay, Australia

[21] Appl. No.: 220,410

[22] Filed: Dec. 29, 1980

Related U.S. Application Data

[63] Continuation of Ser. No. 932,022, Aug. 8, 1978, abandoned.

[30] Foreign Application Priority Data

Aug. 9, 1977 [AU] Australia .............................. PD1154

[51] Int. Cl.³ ............................................ A01B 15/02
[52] U.S. Cl. .................................. 172/721; 172/753;
172/762; 403/334
[58] Field of Search ............... 172/699, 713, 719, 721,
172/749, 750, 751, 753, 762, 763; 403/287, 331,
333, 334, 354; 37/142 R, 142 A

[56] References Cited

U.S. PATENT DOCUMENTS

| 9,433 | 11/1852 | Richardson | 172/721 |
| 140,660 | 7/1873 | Vairin | 172/749 X |
| 2,783,701 | 3/1957 | Padrick | 172/699 |
| 2,885,801 | 5/1959 | Hill | 37/142 R |
| 3,292,280 | 12/1966 | Launder et al. | 172/750 X |

FOREIGN PATENT DOCUMENTS

216144 7/1958 Australia .............................. 172/753

Primary Examiner—Richard T. Stouffer
Attorney, Agent, or Firm—Ladas & Parry

[57] ABSTRACT

A plow shank has a digging blade attached to the lower extremity thereof by an adaptor. The digging blade has an inclined upper arcuate surface to which the adaptor is releasably secured. The adaptor is also releasably secured to the lower extremity of the shank, such that the blade is located below the lower extremity of the shank to enable the blade to present a low forward facing rounded profile.

10 Claims, 19 Drawing Figures

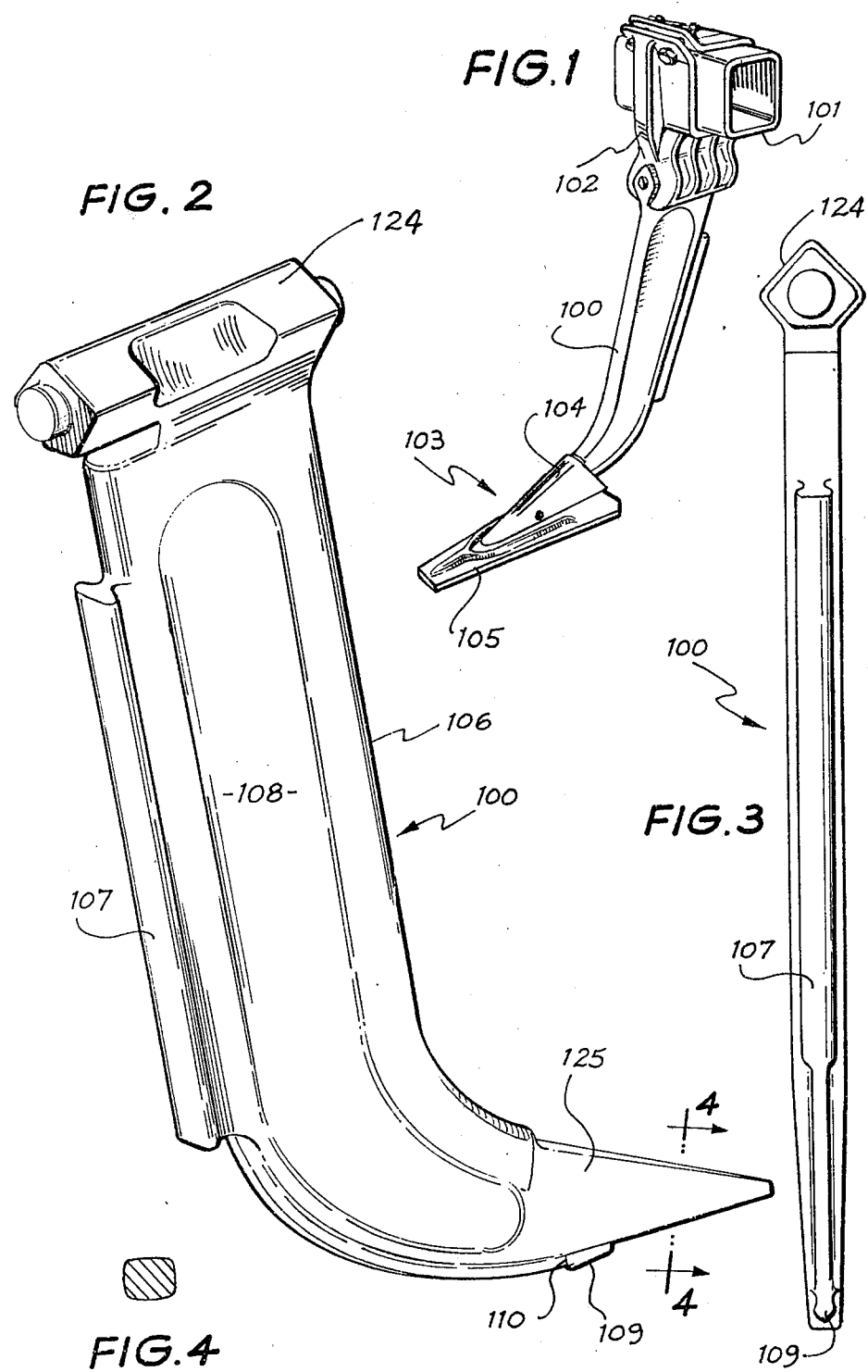

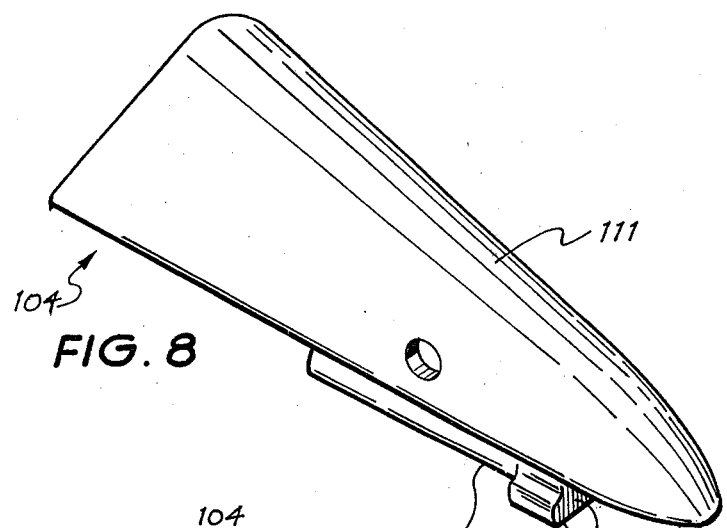
FIG. 8
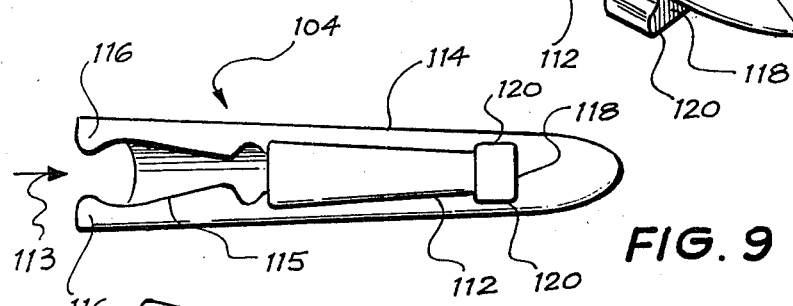
FIG. 9
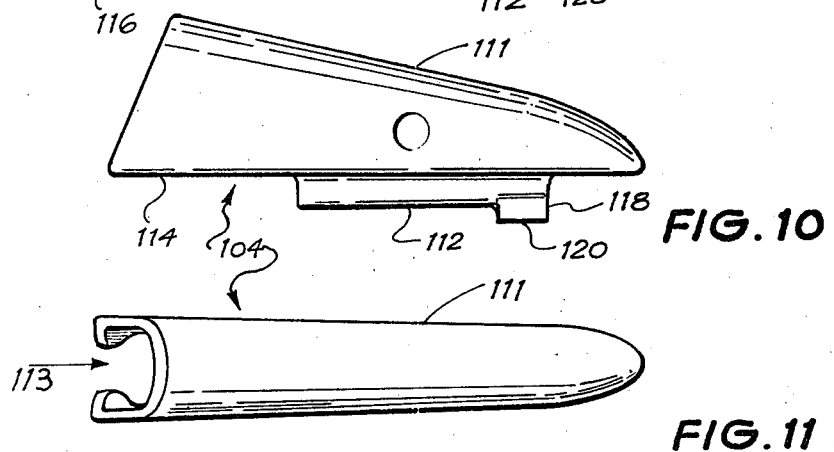
FIG. 10
FIG. 11

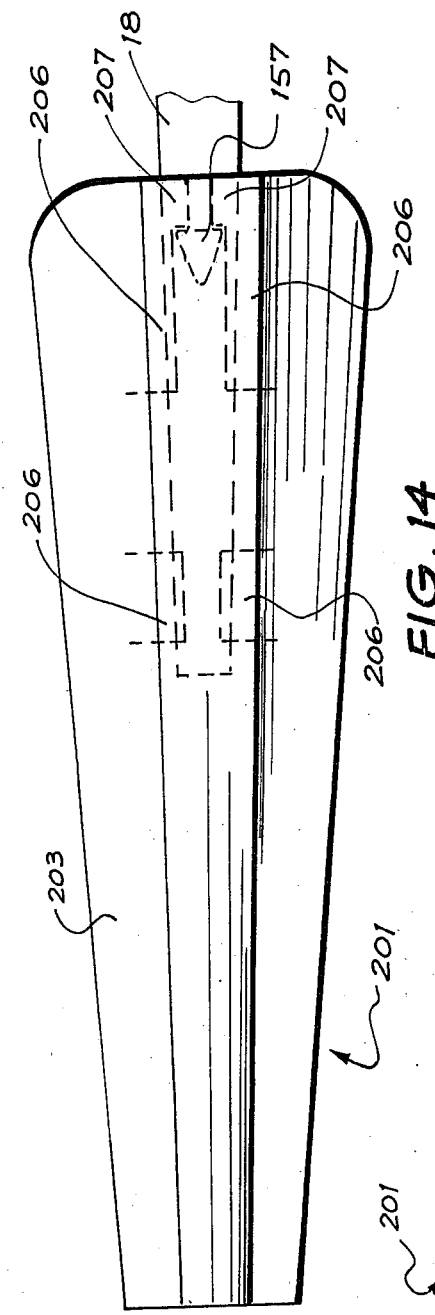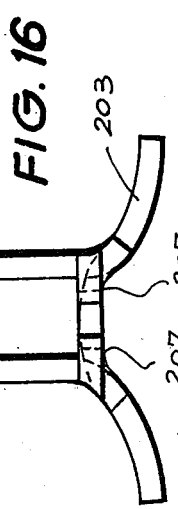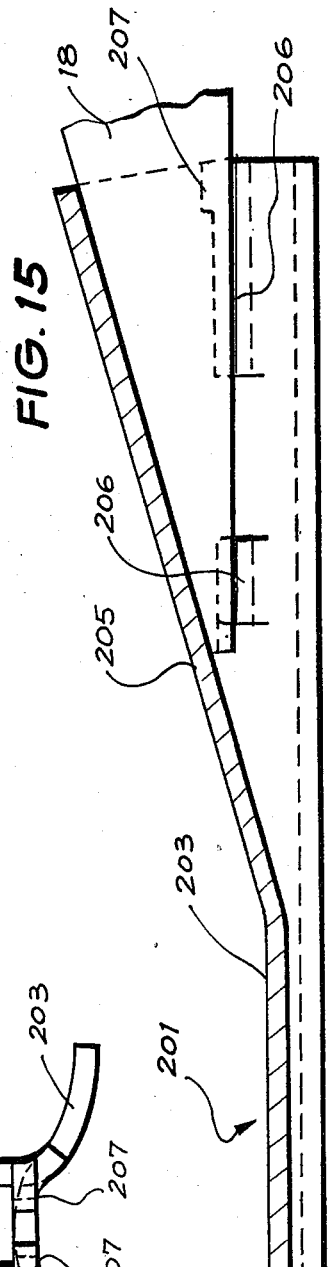

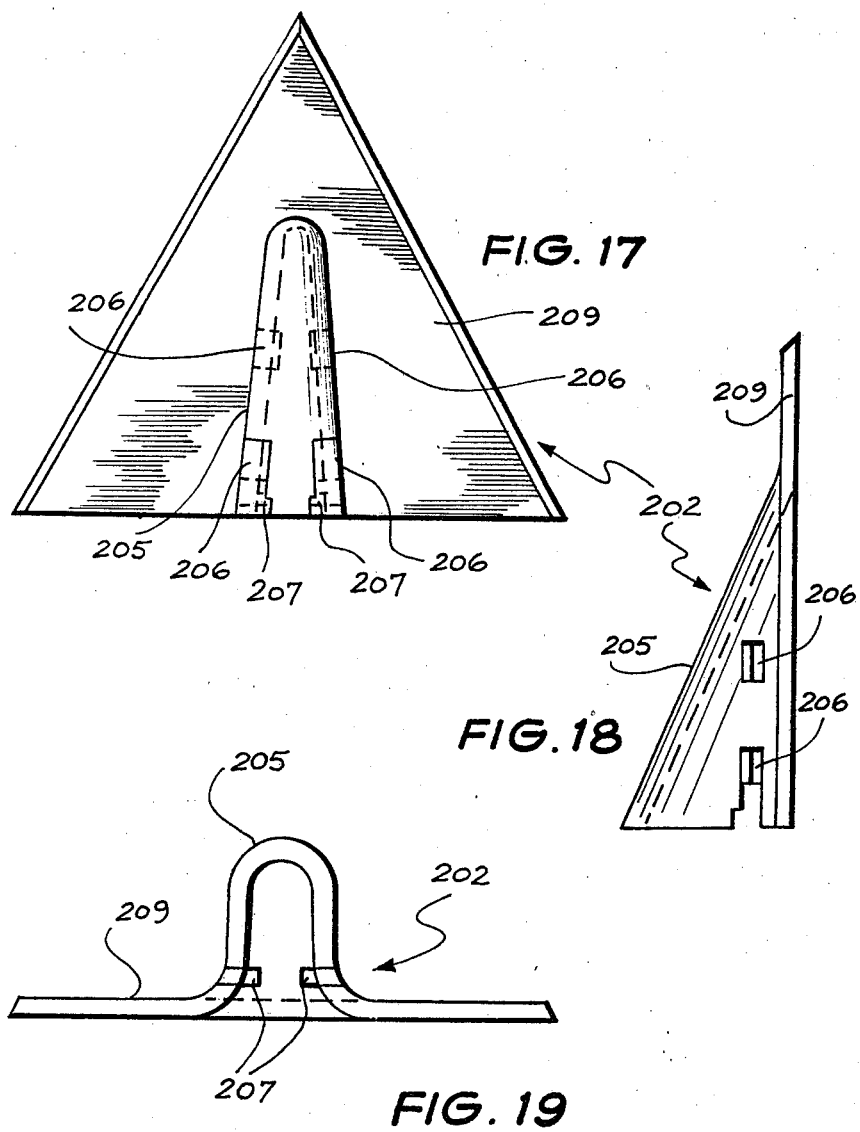

PLOW SHANK AND DIGGING BLADE ATTACHED TO LOWER EXTREMITY THEREOF BY ADAPTOR

This is a continuation, of application Ser. No. 932,022 filed Aug. 8, 1978, now abandoned.

The present invention relates to ploughing apparatus and more particularly to digging points and their method of attachment to plough shanks.

Conventional apparatus used for ploughing have several major disadvantages in that they are usually designed to make several passes of the same piece of ground and/or are designed to invert the soil before the seed and/or fertiliser is deposited below the soil surface. This known method results in breaking up of the soil structure which is detrimental to new growth resulting from germination of the newly planted seed. It is also a disadvantage that the worked soil loses its moisture.

A further disadvantage of conventional ploughing apparatus is that the shank, the clamp attaching the shank to the plough tool bar, and the digging point are not all formed separately in that frequently the shank is formed integral with the clamp while the digging points, the part subjected to greatest wear, are not easily removed or replaced. Accordingly known apparatus are expensive by way of replacement parts and tend to be tedious and time consuming when parts have to be replaced.

It is the object of the present invention to ameliorate the above disadvantages by providing an improved digging point which in the described embodiments assists plant germination and growth whilst making best use of fertilisers applied to the soil during seeding.

In general form the present invention is a digging point for removable attachment to a plough shank comprising a digging blade portion, a shank engaging portion fixed to the blade portion, said engaging portion having means for removably attaching the digging point to the plough shank.

A preferred form of the present invention will now be described by way of example with reference to the accompanying drawings herein:

FIG. 1 is a perspective view of a plough shank and digging point attached to a tool bar;

FIG. 2 is a perspective view of the shank of FIG. 1;

FIG. 3 is an end elevation of the shank of FIG. 2;

FIG. 4 is a section of the shank of FIG. 2 taken along the line 4—4;

FIG. 8 is a perspective view of the adaptor of FIG. 1;

FIG. 9 is a bottom plan view of the adaptor of FIG. 8;

FIG. 10 is a side elevation of the adaptor of FIG. 8;

FIG. 11 is a top plan view of the adaptor of FIG. 8;

FIG. 14 is a plan view of an alternative digging point to that of FIG. 1;

FIG. 15 is a side sectioned elevation of the point of FIG. 14;

FIG. 16 is an end elevation of the point of FIG. 15;

FIG. 17 is a plan view of a further alternative digging point;

FIG. 18 is a side elevation of the point of FIG. 17;

FIG. 19 is an end elevation of the point of FIG. 17.

Figure 5:
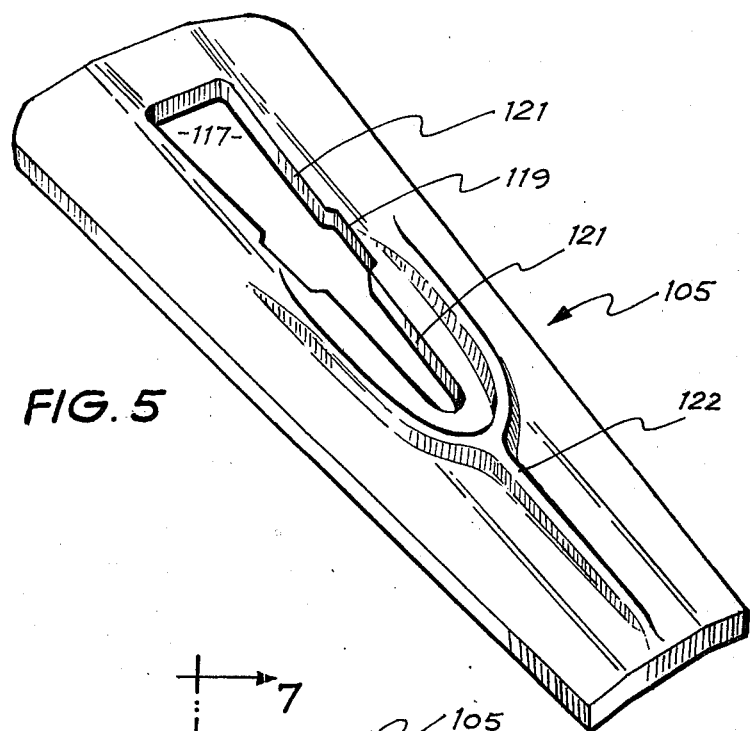
FIG. 5 is a perspective view of the digging blade of FIG. 1.

In FIG. 1 there is depicted a ploug shank 100 attached to a tool bar 101 of a plough frame by means of a clamp 102. Removably attached to the shank 100 is a digging point 103 consisting of an adaptor 104 and digging blade 105. The shank 100 is more fully depicted in FIGS. 2 to 4 which show that the shank is provided with a round leading edge portion 106 connected to a trailing to portion 107 by web 108. The trailing portion 107 is adapted receive attachments to carry out further digging or seeding functions.

The top end of the shank has a tapered lobed portion 124 which is received in a recess of corresponding shape in the clamp 102. The recess is tapered to rigidly engage the lobed portion 124 and tapers from the front of the recess to the back with respect to the normal direction of travel of the plough. The clamp 102 and lobe portion 124 are adapted to mount the shank 100 so that it is inclined by 60° to 80° to the horizontal, and most preferably so that the leading surface of the rounded portion 106 is inclined by 75° to the horizontal.

The lower portion 125 of the shank 100 is of tapering rectangular cross section, as seen in FIG. 4, and has a projection 109 which removably engages a catch on the digging point 103.

The projection 109 is of forwardly tapering triangular shape so as to present a rearwardly facing abutment 110 while the forward tapered profile aids in attachment of the digging point 103.

In FIGS. 8 to 11 there is shown an adaptor 104 which forms part of the digging point 103 and which attaches the digging blade 105 to the shank 100. The adaptor 104 comprises a body part 111 which engages the lower portion 125 of the shank 100 and a projecting part 112 which engages the digging blade 105. Within the body part 111 there is defined a tapering cavity 113 which extends through the majority of the part 111 and is shaped to receive the lower portion 125 of the shank 100. The lower wall 114 of the part 111 is shaped to define a recess 115 which recess 115 is shaped to securely removably engage the projection 109 with the lobe parts 116 located behind and engaging the abutment 110 of the shank 100. When inserting the projection 109 in the recess 115, the wall 114 is deflected resiliently outwardly to allow entry of the projection 109, and once in place the wall 114 springs back into shape to securely engage the projection 109.

Figure 6:
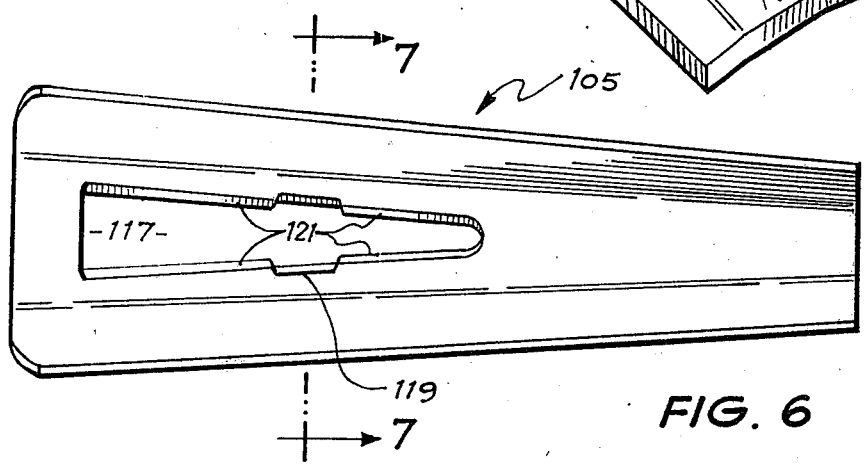
FIG. 6 is a bottom plan view of the blade of FIG. 5.
Figure 7:
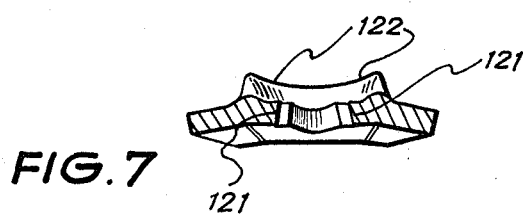
FIG. 7 is a section of FIG. 6 taken along the line 7—7.

The projecting part 112 is shaped to engage the blade 105, see FIGS. 5 to 7, more particular is shaped to engage the slot 117. Part 112 has a "T" shaped end portion 118 which passes through enlarged recess portion 119 and which when moved forward with respect to the blade 105 is located beneath the blade 105 to sandwich the blade 105 between the projecting extremities 120 of the "T" shaped end portion 118 and the lower wall 114 of the body part 111. The recess 117 has walls 121 which taper so as to converge upwardly so as to securely engage the longitudinally extending portion of the projection 112.

The blade 105, in order to minimise wear, has a branched ridge 122 which acts to retain a layer of soil adjacent the leading face of the adaptor 104. This layer reduces abrasion in that area.

In combination the blade 105 and adaptor 104 engage the shank 100 so that the blade 105 is inclined by 5° to 15° to the horizontal, and most preferably 8°.

Figures 12, 13:
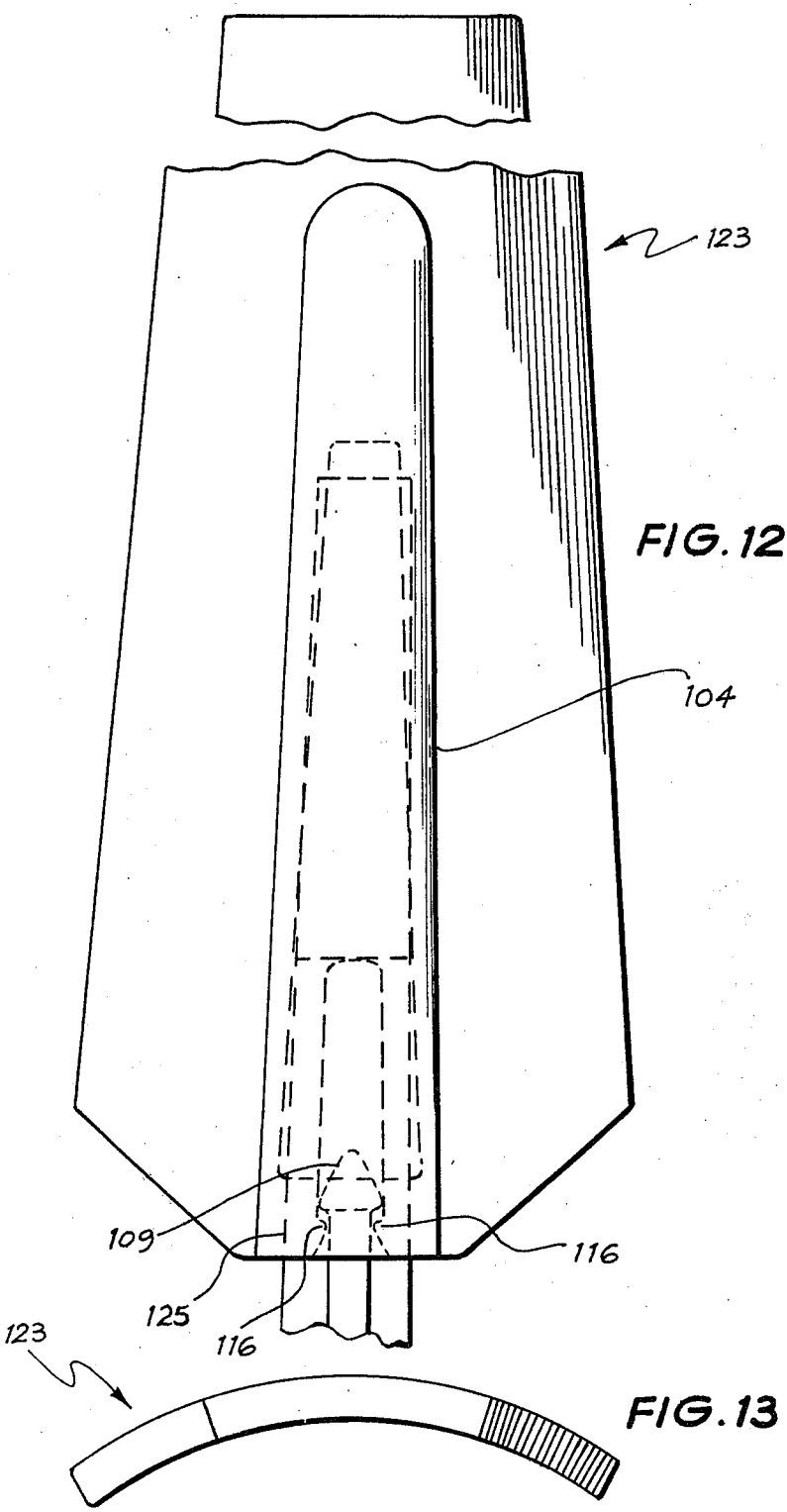
FIG. 12 is a plan view of an alternative blade to that of FIG. 5.
FIG. 13 is an end elevation of the blade of FIG. 12.

In FIGS. 12 and 13 an alternative blade 123 is depicted as having a rounded cross-section as best shown in FIG. 13.

The blade 123 is of such configuration that during operation it exerts an upward and sideward force on the soil to thus break and cultivate the soil located between adjacent shanks. Additionally the plate 123 has a low digging angle to prevent soil inversion. This is in contrast to traditionally accepted methods of cultivation which teach that the soil should be inverted. Similar parts of these FIGS. 12 and 13 have been given the same numerals as corresponding parts of FIGS. 5 to 11.

With the above arrangement of adaptor 104 and digging blades it is possible to interchange the digging blades in order to vary digging functions, also it enables the replacement of worn plates while still retaining the same adaptor.

FIGS. 14 to 19 depict two further digging points 201 and 202 which may be used to replace the digging point 103, the difference being that the adaptor 104 of FIGS. 1 and 8 is no longer required since the digging points 201 and 202 are manufactured with integral adaptor and digging blade. Preferably the digging points 201 and 202 are press manufactured from sheet material.

With reference to FIGS. 14 to 16 it should be noted that the digging blade 203 has a rounded contour so as to exert an upward and sideward force on the soil. Also the digging point 201 has a cavity defining portion 205 to receive the end 125 of the shank 100. The portion 205 is tapered and is provided with spring tabs 206 to engage the end 125 and tabs 207 to be located behind the abutment surface 110 of shank 100.

The digging point 202 is similar in construction to digging point 201 except that it is provided with flat digging blade 209. The various parts of the digging point 202 have the same reference numbers as the corresponding parts of digging point 201.

The construction of the digging points 201 and 202 is reasonably inexpensive since they may be pressed from sheet material while a further advantage is that they may be easily removed from the shank to allow replacement when worn or for the insertion of a digging point to perform a different function. Due to the flexibility of the tabs 207 they may be flexed outwardly to allow removal of the striker 157.

Again with reference to FIGS. 5 to 7 the projection 112, in order to more securely engage the walls 121, has its longitudinally extending side walls diverging downwardly to provide a dove-tail cross-section. This configuration prevents the blade 105 from being pulled from the adaptor 104 during use.

I claim:

1. Plowing apparatus comprising, in combination, an elongated plow shank which, in use, extends generally vertically and a plow digging point removably attached to the lower extremity of said shank so as to be drawn through soil thereby to cultivate the soil, said digging point including a digging blade and an adaptor, said blade having an upper earth working surface arcuate in transverse cross section so as to be generally convexed with downwardly sloping sides, said adaptor engaging said blade to releasably secure said blade to said shank and having a forwardly tapering recess which receives and generally encompasses said lower extremity of said shank, said adaptor and said blade having cooperating means for releasably securing said adaptor to said upper earth working surface of said blade, said adaptor and said cooperating means being configured so that said upper earth working surface is rearwardly upwardly inclined by from 5° to 15° with respect to the horizontal, said blade being located below said lower extremity of said shank to thereby enable said blade to present a low forward facing rounded profile.

2. Plowing apparatus according to claim 1, wherein said digging blade has a leading edge which extends generally normal to the usual direction of travel of said plow digging point through soil so that said blade has the general configuration of a chisel.

3. Plowing apparatus according to claim 2, wherein said upper earth working surface of said digging blade is inclined to the horizontal by substantially 8°.

4. Plowing apparatus according to claim 1, wherein said lower extremity of said plow shank is provided with a shank projection, said adaptor having clip means comprising a shaped recess in releasable engagement with said shank projection.

5. Plowing apparatus according to claim 4, wherein said tapering recess of said adaptor, in which said lower extremity of said shank is received and generally encompassed, extends forwardly from an opening in the rear of said adaptor, and wherein said shaped recess of said clip means of said adaptor extends from said opening in communicating relationship with said tapering recess.

6. Plowing apparatus according to claim 5, wherein said shaped recess of said clip means of said adaptor is partly defined laterally by two opposing lug projections which are configured and resiliently movable apart to allow entry of said shank projection into said shaped recess and to securely removably lock said shank projection within said shaped recess.

7. Plowing apparatus according to claim 1, wherein said cooperating means of said adaptor and said digging blade includes engaging means on said adaptor and engageable means on said blade to removably secure said blade to said adaptor.

8. Plowing apparatus according to claim 7, wherein said engaging means on said adaptor is a projection on a bottom face of said adaptor, said projection having a downwardly projecting part and a transversely extending part fixed to a lower portion of said downwardly projecting part, said engageable means on said digging blade being a recess with an enlarged portion to allow said transversely extending part to pass therethrough and engage a lower surface of said digging blade to secure said blade to said adaptor.

9. Plowing apparatus according to claim 8, wherein said recess on said digging blade has forwardly tapered side wall portions to engage said downwardly projecting part.

10. Plowing apparatus according to claim 1, wherein said upper earth working surface of said digging blade is inclined to the horizontal by substantially 8°.

* * * * *